(12) United States Patent
Umino

(10) Patent No.: US 11,639,743 B2
(45) Date of Patent: May 2, 2023

(54) ELASTIC SUPPORT DEVICE

(71) Applicant: MAYEKAWA MFG. CO., LTD., Tokyo (JP)

(72) Inventor: Tatsuya Umino, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 306 days.

(21) Appl. No.: 17/251,386

(22) PCT Filed: Dec. 4, 2019

(86) PCT No.: PCT/JP2019/047451
§ 371 (c)(1),
(2) Date: Dec. 11, 2020

(87) PCT Pub. No.: WO2020/137402
PCT Pub. Date: Jul. 2, 2020

(65) Prior Publication Data
US 2021/0239176 A1   Aug. 5, 2021

(30) Foreign Application Priority Data

Dec. 25, 2018 (JP) .............................. JP2018-241368

(51) Int. Cl.
*H01F 7/02* (2006.01)
*F16F 6/00* (2006.01)
(Continued)

(52) U.S. Cl.
CPC ............. *F16F 6/005* (2013.01); *F16M 13/02* (2013.01); *H01F 7/02* (2013.01); *A22B 5/0041* (2013.01);
(Continued)

(58) Field of Classification Search
USPC .............. 248/274.1, 288.11, 289.11, 289.31, 290.1, 248/683, 206.5, 309.4
See application file for complete search history.

(56) References Cited

U.S. PATENT DOCUMENTS 4,644,205 A    2/1987 Sudo
4,865,285 A *  9/1989 Gaggianese ......... B43M 99/004
                                                211/DIG. 1
(Continued)

FOREIGN PATENT DOCUMENTS

CN          1229307 A    9/1999
CN        206442250 U    8/2017
(Continued)

OTHER PUBLICATIONS

International Search Report issued in Intl. Appln. No. PCT/JP2019/047451 dated Feb. 25, 2020 English translation provided.
(Continued)

*Primary Examiner* — Alfred J Wujciak
(74) *Attorney, Agent, or Firm* — Rossi, Kimms & McDowell LLP

(57) ABSTRACT

An elastic support device according to an embodiment includes: a first member including a first magnet; and a second member including a second magnet, disposed so as to face the first member, and movable relative to the first member in response to receipt of an external force. A magnetic force acting between the first magnet and the second magnet holds the second member in an original position when the second member does not receive an external force, and the magnetic force returns the second member to the original position when the second member is moved due to receipt of an external force.

8 Claims, 12 Drawing Sheets

(51) Int. Cl.
*F16M 13/02* (2006.01)
*A22B 5/00* (2006.01)
*A22C 17/00* (2006.01)
*B25J 11/00* (2006.01)
*B25J 15/00* (2006.01)
*B25J 17/02* (2006.01)

(52) U.S. Cl.
CPC ....... *A22C 17/0006* (2013.01); *B25J 11/0045* (2013.01); *B25J 15/0019* (2013.01); *B25J 17/02* (2013.01)

(56) References Cited

U.S. PATENT DOCUMENTS

| | | | |
|---|---|---|---|
| 7,740,214 B2 * | 6/2010 | Marsilio | F16M 11/041 340/568.8 |
| 9,615,591 B1 | 4/2017 | Stooker | |
| 2012/0086635 A1 * | 4/2012 | Park | G06F 3/03548 345/157 |
| 2013/0164108 A1 | 6/2013 | Yoshizuka | |
| 2016/0029650 A1 | 2/2016 | Hazenbroek | |

FOREIGN PATENT DOCUMENTS

| | | |
|---|---|---|
| GB | 2335242 A | 9/1999 |
| JP | S51105143 A | 9/1976 |
| JP | S531946 A | 1/1978 |
| JP | 2006207662 A | 8/2006 |
| WO | 2008096460 A1 | 8/2008 |

OTHER PUBLICATIONS

Written Opinion issued in Intl. Appln. No. PCT/JP2019/047451 dated Feb. 25, 2020.
Office Action issued in European Appln. No. 19904189.8 dated Apr. 11, 2022.
English translation of Written Opinion issued in Intl. Appln. No. PCT/JP2019/047451 dated Feb. 25, 2020, previously cited in IDS filed Dec. 11, 2020.
International Preliminary Report on Patentability issued in Intl. Appln. No. PCT/JP2019/047451 dated Jul. 8, 2021. English translation provided.
Office Action issued in Chinese Appln. No. 201980077283.0 dated May 19, 2022.
Partial supplementary European search report issued in European Appln. No. 19904189.8 dated Aug. 4, 2021.
Extended European Search Report issued in European Appln. No. 19904189.8 dated Nov. 5, 2021.

* cited by examiner

Cross-section B-B

Cross-section C-C

Cross-section D-D

ELASTIC SUPPORT DEVICE

TECHNICAL FIELD

The present disclosure relates to an elastic support device.

BACKGROUND

There may be a need for compliance function which keeps a machine element in a fixed position anytime and allows, when an external force of a certain magnitude or more acts on the machine element, the machine element to escape from the fixed position in the same direction as the external force, and when the external force falls below the certain magnitude, to return to the fixed position. For example, in the case of tracing a certain trajectory with a tool attached to the tip of a multi-axis articulated arm, it is necessary to, when the tool is pushed in a direction deviating from the planned trajectory by an external force, generate a reaction force to push back against the external force, and when the external force disappears, return the tool to the fixed position.

Patent Document 1 discloses a cutter mechanism for cutting bone-in meat of a slaughtered animal to separate meat from bone, where the aforementioned function is realized by elastically supporting a knife with a compression spring or the like.

CITATION LIST

Patent Literature

Patent Document 1: WO2008/096460A

SUMMARY

Problems to be Solved

Generally, the compliance function is realized by using power of an air cylinder, a hydraulic cylinder, or a motor, or as described in Patent Document 1, by means of a compression spring or a weight, which do not use external power. However, these means have many contact portions such as sliding portions, so that the friction on the contact portions wastes power and thus requires a large amount of power, which inevitably causes a problem that the device becomes large in size. Further, the means such as a compression spring and a weight, which do not use external power, require a large space since the guide block and the compression spring have lengths in the operating direction of compliance.

An object of an embodiment is to provide a compact device by reducing contact portions and reducing the influence of friction in a machine element having the compliance function.

Solution to the Problems (1) An elastic support device according to an embodiment comprises: a first member including a first magnet; and a second member including a second magnet, disposed so as to face the first member, and movable relative to the first member in response to receipt of an external force. A magnetic force acting between the first magnet and the second magnet holds the second member in an original position when the second member does not receive an external force, and the magnetic force returns the second member to the original position when the second member is moved due to receipt of an external force.

Herein, the term "original position" indicates the position of the second member when no external force is applied to the second member.

In the above configuration (1), when no external force is applied to the second member, the magnetic force acting between the first member and the second member is balanced, so that the second member is held in the original position. When an external force is applied to the second member, and the second member is moved, the magnetic force acting on the second member loses balance and tends to return the second member to the original position, so that the second member returns to the original position once the external force is no longer applied. Since the magnetic force acts on the second member in a non-contact manner, no friction is generated in the transmission path of the magnetic force. Accordingly, it is possible to reduce the power necessary for moving the second member, and since a space is not required for the length of a spring in the operating direction of the second member unlike the spring member, it is possible to achieve a compact device configuration. Further, since the magnetic force is a contactless urging force, the force acting on the second member is stable, so that the second member can be held in the original position with high accuracy when no load is applied.

(2) In an embodiment, in the above configuration (1), a first surface formed by the first member and a second surface formed by the second member are disposed so as to face each other, and the first magnet is disposed on the first surface, and the second magnet is disposed on the second surface.

With the above configuration (2), since the first magnet and the second magnet are disposed on the surfaces facing each other, they can be arranged close to each other. Accordingly, magnetic forces generated by the two magnets can effectively act on each other.

(3) In an embodiment, in the above configuration (1) or (2), the first magnet and the second magnet are disposed so that different magnetic poles face each other in the original position to generate an attractive force between the first magnet and the second magnet. With the above configuration (3), when no external force is applied to the second member, the second member is held in the original position by the attractive force acting between the first member and the second member.

When the second member is moved from the original position due to an external force, the magnetic force works to return to the original position by the attractive force acting between the first member and the second member. Accordingly, when the external force is no longer applied to the second member, the second member can return to the original position.

(4) In an embodiment, in the above configuration (3), each of the first magnet and the second magnet includes a plurality of magnets arranged at intervals along a moving direction of the second member, and the pluralities of magnets of the first magnet and the second magnet are arranged so that magnetic poles alternately different along the moving direction of the second member are facing counter magnets.

With the above configuration (4), when no external force is applied to the second member, the second member is held in the original position by the attractive force acting between the first member and the second member. When the second member is moved from the original position due to an external force, each second magnet receives an attractive force from the first magnet disposed upstream in the moving direction, and receives a repulsive force from the first magnet disposed downstream in the moving direction. Accordingly, when the external force is no longer applied to the second member, the second member can return to the original position quickly and accurately.

(5) In an embodiment, in the above configuration (1) or (2), a first magnetic pole of the first magnet is disposed so as to face toward the second member, and the first magnetic pole of the second magnet is disposed so as to face toward the first member, and a repulsive force acting between the first member and the second member is balanced when the second member is in the original position, and the repulsive force acts between the first member and the second member so as to return the second member to the original position when the second member is moved due to an external force acting on the second member.

Here, the first magnetic poles of the first magnet and the second magnet are intended to be the same magnetic pole.

With the above configuration (5), when the second member is in the original position, the repulsive force acting on the second member is balanced, so that the second member is held in the original position. When an external force is applied to the second member, and the second member is moved, this balance is lost, and the repulsive force tends to return the second member to the original position, so that the second member returns to the original position when the external force is no longer applied.

(6) In an embodiment, in the above configuration (5), each of the first magnet and the second magnet includes a plurality of magnets arranged at intervals along a moving direction of the second member, and each of the plurality of magnets of the first magnet is disposed at an intermediate position between the plurality of magnets of the second magnet along the moving direction of the second member in the original position.

With the above configuration (6), when the second member is in the original position, the repulsive forces of the first member on both sides in the moving direction of the second member are balanced, so that the second member is held in the original position. When an external force is applied to the second member, and the second member is moved, the repulsive forces acting on each magnet loses balance, and a force is generated to return the second member to the original position. Accordingly, when the external force is no longer applied, the second member can return to the original position accurately.

(7) In an embodiment, in any one of the above configurations (1) to (6), at least one of the first magnet or the second magnet is composed of a permanent magnet.

With the above configuration (7), it is possible to eliminate the necessity of a cable for supplying current to the first magnet or the second magnet, as required in an electromagnet. Therefore, there is no risk that the cable is entangled with the first member or the second member by the movement of the members, hindering the free movement of the second member, or that the presence of the cable limits the amount of movement of the second member.

(8) In an embodiment, in any one of the above configurations (1) to (7), the first member constitutes one of an inner shaft or an outer shaft of a double structure, and the second member constitutes the other of the inner shaft or the outer shaft, and one of the inner shaft or the outer shaft is rotatable about an axis of the inner shaft and the outer shaft relative to the other of the inner shaft or the outer shaft.

With the above configuration (8), it is possible to perform compliance operation in which the second member is elastically supported by an urging force against the swinging motion about the axis of the second member and returned to the original position.

(9) In an embodiment, in any one of the above configurations (1) to (8), the second member is slidable relative to the first member.

With the above configuration (9), it is possible to perform compliance operation in which the second member is elastically supported by an urging force against the sliding motion of the second member and returned to the original position.

(10) In an embodiment, in the above configuration (9), the first member constitutes one of an inner shaft or an outer shaft of a double structure, and the second member constitutes the other of the inner shaft or the outer shaft, and one of the inner shaft or the outer shaft is movable along an axial direction of the inner shaft and the outer shaft relative to the other of the inner shaft or the outer shaft.

With the above configuration (10), since the first member and the second member are formed by the inner shaft and the outer shaft of the double structure, the second member can stably move in the axial direction, and a space can be easily ensured for arranging the urging-force generating part on opposite surfaces of the inner shaft and the outer shaft.

(11) In an embodiment, in any one of the above configurations (1) to (10), the second member includes an attachment part for attaching a support target part.

With the above configuration (11), since the second member includes the attachment part for attaching a support target part, a desired work can be performed by using the support target part attached to the second member as a tool, and the compliance function can be provided to the tool.

Advantageous Effects

According to some embodiments, in a machine element having the compliance function, it is possible to reduce friction acting on the machining element and thus reduce the necessary power. In addition, since a space is not required for the length of a compression spring as required in the compression spring system, it is possible to achieve a compact device.

DETAILED DESCRIPTION

Figure 1:
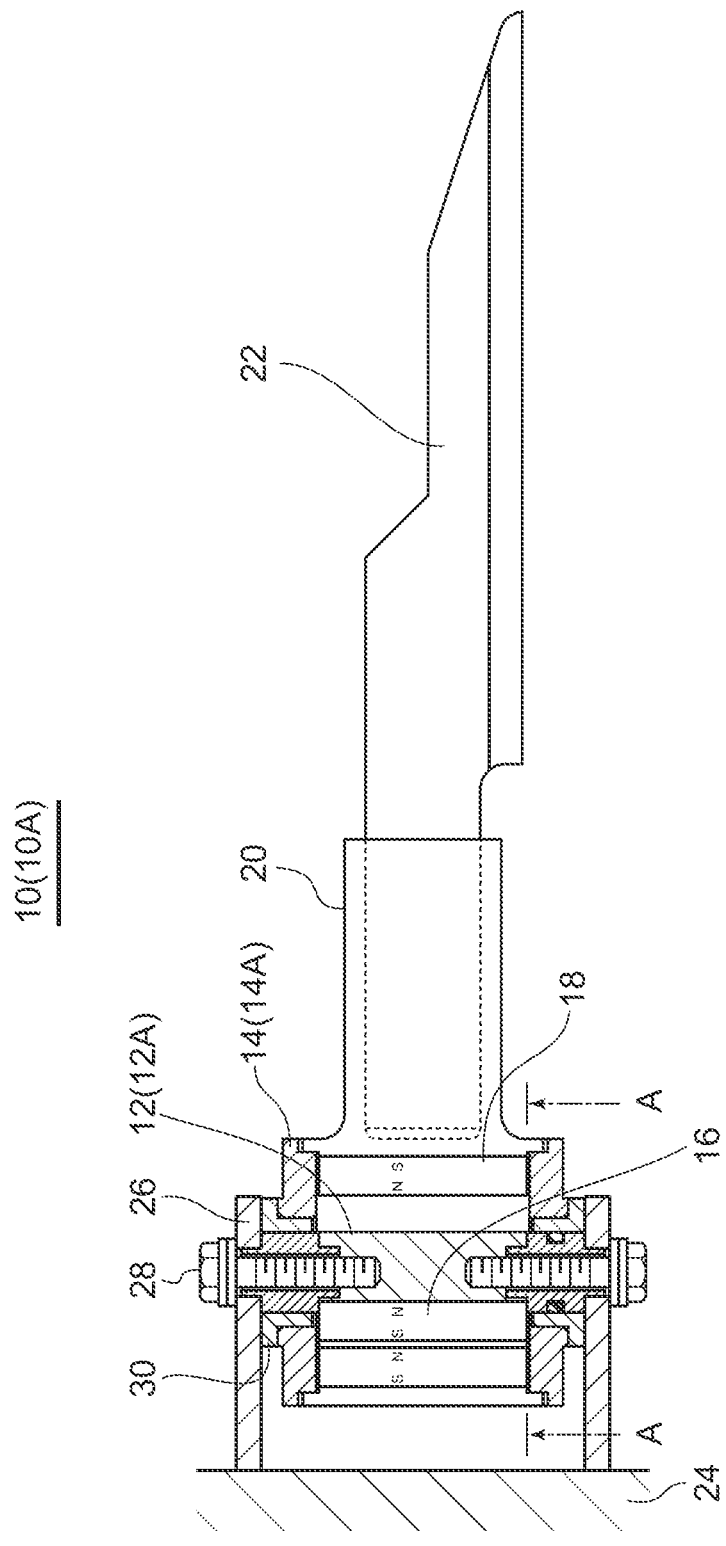
FIG. 1 is a front cross-sectional view of an elastic support device according to an embodiment.

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIGS. 1 to 7A and 7B show an elastic support device 10 (10A, 10B, 10C, 10D) according to some embodiments. Each elastic support device 10 (10A to 10D) includes a first member 12 (12A, 12B) having a first magnet 16, and a second member 14 (14A, 14B) having a second magnet 18 and disposed so as to face the first member 12. The second member 14 is configured to be movable relative to the first member 12 in response to receipt of an external force. A magnetic force acting between the first magnet 16 and the second magnet 18 holds the second member 14 in the original position when the second member does not receive external force F or external force F', and returns the second member 14 to the original position when the second member 14 is moved in response to receipt of external force F or external force F'.

When external force F or external force F' is not applied to the second member 14, the magnetic force acting between the first member 12 and the second member 14 is balanced, so that the second member 14 is held in the original position. When external force F or external force F' is applied to the second member 14, and the second member 14 is moved in a direction of the arrow "a", the magnetic force acting on the second member 14 loses balance and tends to return the second member 14 to the original position, so that the second member 14 returns to the original position when external force F or external force F' is no longer applied. Thus, the compliance function is achieved. Since the magnetic force acts on the second member 14 in a non-contact manner, no friction is generated in the transmission path of the magnetic force. Accordingly, it is possible to reduce the power necessary for moving the second member 14, and since a space is not required for the length of a spring in the operating direction of the second member 14 unlike the spring member, it is possible to achieve a compact device configuration. Further, since the magnetic force is a contactless urging force, the force acting on the second member 14 is stable, so that the second member 14 can be held in the original position with high accuracy when no load is applied.

In an embodiment, as shown in each figure, the second member 14 is integrally provided with a support target part 20 for attaching an attachment part 22. With this configuration, a desired work can be performed by using the attachment part 22 attached to the second member 14 as a tool, and the compliance function can be provided to the tool. The second member 14 is configured to be rotatable when the attachment part 22 receives external force F or external force F' in a certain direction, i.e., external force F or external force F' in a direction in which the second member 14 can rotate (arrow "a" direction).

In an embodiment, a first surface 12a formed by the first member 12 and a second surface 14a formed by the second member 14 are disposed so as to face each other. The first magnet 16 is disposed on the first surface 12a, and the second magnet 18 is disposed on the second surface 14a. The first magnet 16 disposed on the first surface 12a and the second magnet 18 disposed on the second surface 14a can be arranged close to each other. Accordingly, magnetic forces generated by the two magnets can effectively interact.

Figure 2:
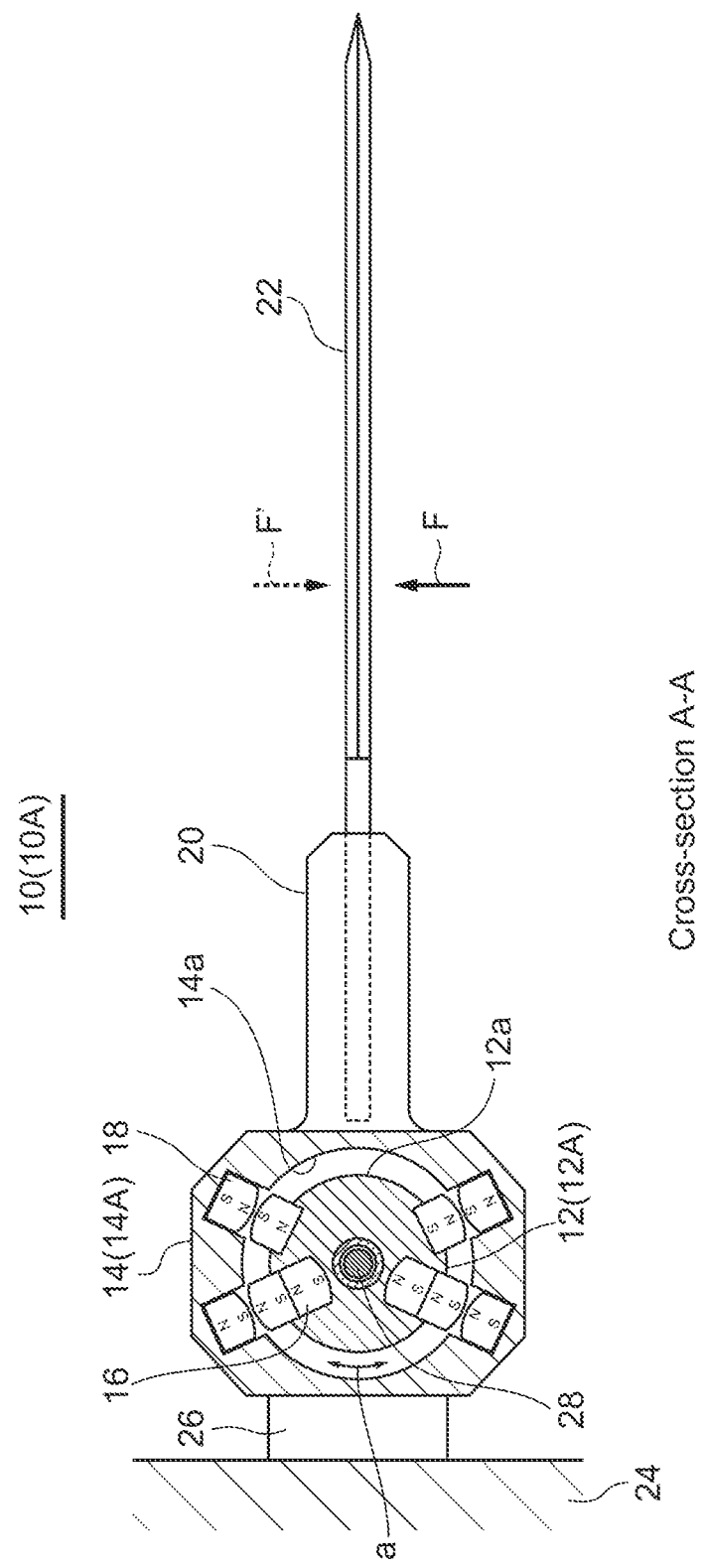
FIG. 2 is a plan cross-sectional view taken along line A-A in FIG. 1.
Figure 3:
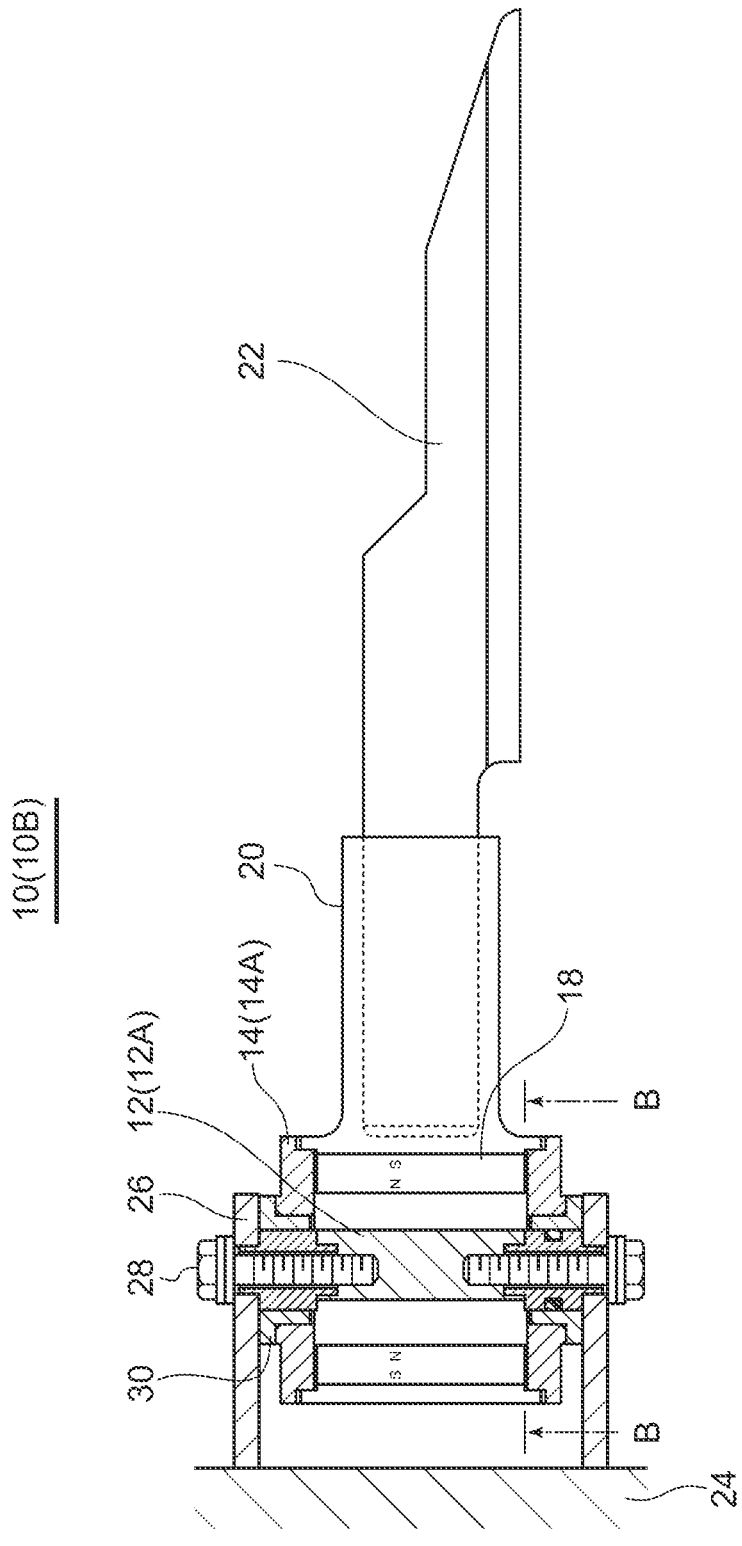
FIG. 3 is a front cross-sectional view of an elastic support device according to an embodiment.
Figure 5:
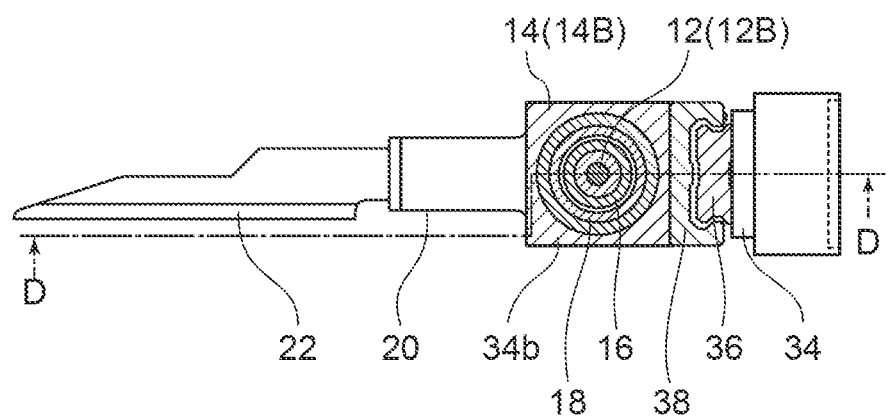
FIG. 5 is a front cross-sectional view of an elastic support device according to an embodiment (cross-section C-C in FIG. 6A).
Figure 6A:
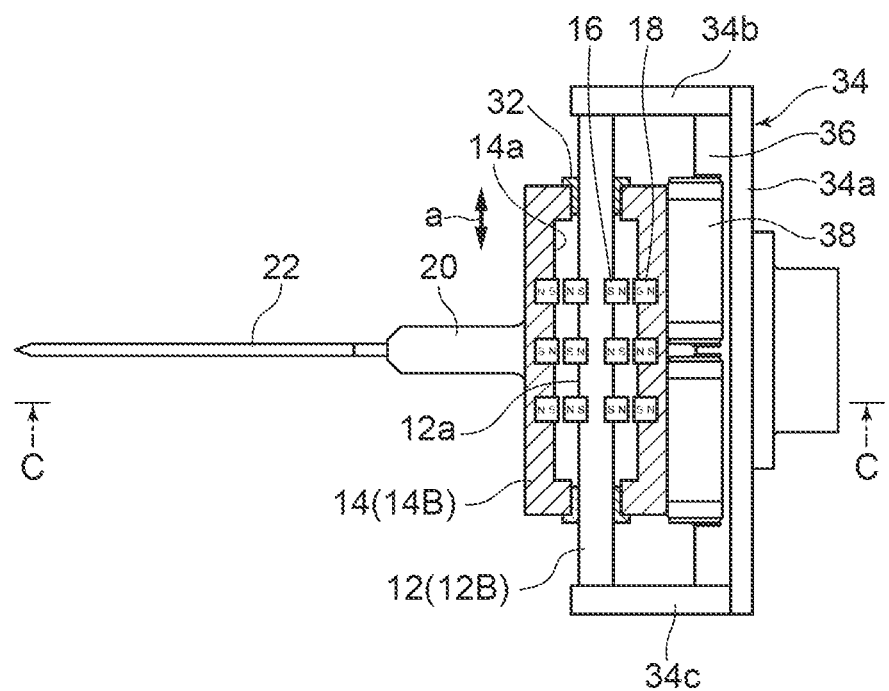
FIG. 6A is a plan cross-sectional view of an elastic support device according to an embodiment.
Figure 6B:
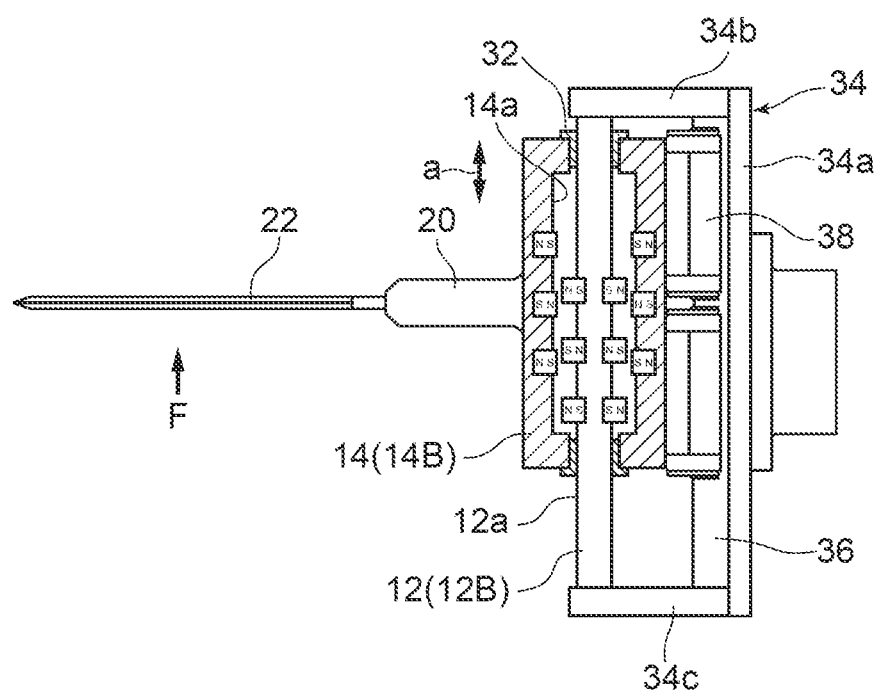
FIG. 6B is a plan cross-sectional view of an elastic support device according to an embodiment (cross-section D-D in FIG. 5).

In an embodiment, in the elastic support device 10 (10A) shown in FIGS. 1 and 2 and the elastic support device 10 (10C) shown in FIGS. 5, 6A, and 6B, the first magnet 16 and the second magnet 18 are disposed so that different magnetic poles face each other in the original position. With this configuration, an attractive force occurs between the first magnet 16 and the second magnet 18, so that when external force F or external force F' is not applied to the second member 14, the second member 14 is held in the original position by the attractive force acting between the first member 12 and the second member 14. When the second member 14 is moved from the original position due to external force F or external force F', the magnetic force works to return the second member 14 to the original position by the attractive force acting between the first member 12 and the second member 14. Accordingly, when external force F or external force F' is no longer applied, the second member 14 can return to the original position.

In the elastic support device 10 (10A, 10C), in an embodiment, the first magnet 16 and the second magnet 18 are disposed so that, in the original position, the magnets overlap in the moving direction of the second member 14, i.e., in the extending direction of the first surface 12a and the second surface 14a (arrow "a" direction). With this configuration, the first magnet 16 and the second magnet 18 can exert an attractive force to each other, so that even when the second member 14 is moved from the original position due to external force F or external force F' acting on the support target part 20, the second member 14 can return to the original position by the attractive force acting between the first member 12 and the second member 14.

In an embodiment, the first magnet 16 and the second magnet 18 have the same size and shape, and are disposed at positions that completely coincide with each other in the arrow "a" direction. As a result, the first magnet 16 and the second magnet 18 can maximize the attractive force to each other.

In an embodiment, a plurality of the first magnets 16 and a plurality of the second magnets 18 are arranged along the arrow "a" direction so that different magnetic poles face each other. As a result, the attractive force generated between the first magnet 16 and the second magnet 18 can be increased.

In an embodiment, each of the first magnet 16 and the second magnet 18 includes a plurality of magnets arranged at intervals along the arrow "a" direction. The pluralities of magnets of the first magnet 16 and the second magnet 18 are arranged so that magnetic poles alternately different along the arrow "a" direction are facing counter magnets. That is, adjacent magnets are arranged so that magnetic poles are opposite on the first member 12 and the second member 14. For example, as shown in FIGS. 2 and 6A, with respect to the arrow "a" direction, in a certain pair of magnets, the south pole of the first magnet 16 and the north pole of the second magnet 18 face each other, and in its adjacent pair, the north pole of the first magnet 16 and the south pole of the second magnet 18 face each other.

According to this embodiment, when external force F or external force F' is not applied to the second member 14, the second member 14 is held in the original position by the attractive force acting between the first member 12 and the second member 14. When the second member 14 is moved from the original position due to an external force, each second magnet 18 receives an attractive force from the first magnet 16 disposed upstream in the moving direction, and receives a repulsive force from the first magnet 16 disposed downstream in the moving direction. Accordingly, when the external force is no longer applied to the second member 14, the second member 14 can return to the original position quickly and accurately.

In another embodiment, as shown in FIG. 2, in the first magnet 16 or the second magnet 18, a plurality of magnets may be arranged along a direction perpendicular to the arrow "a" direction. As a result, the attractive force with the counter magnet can be increased. In FIG. 2, a plurality of magnets is arranged on the first member 12 in the perpendicular direction. Alternatively, a plurality of magnets may be arranged on the second member 14 in the direction perpendicular to the arrow "a" direction.

Figure 4A:
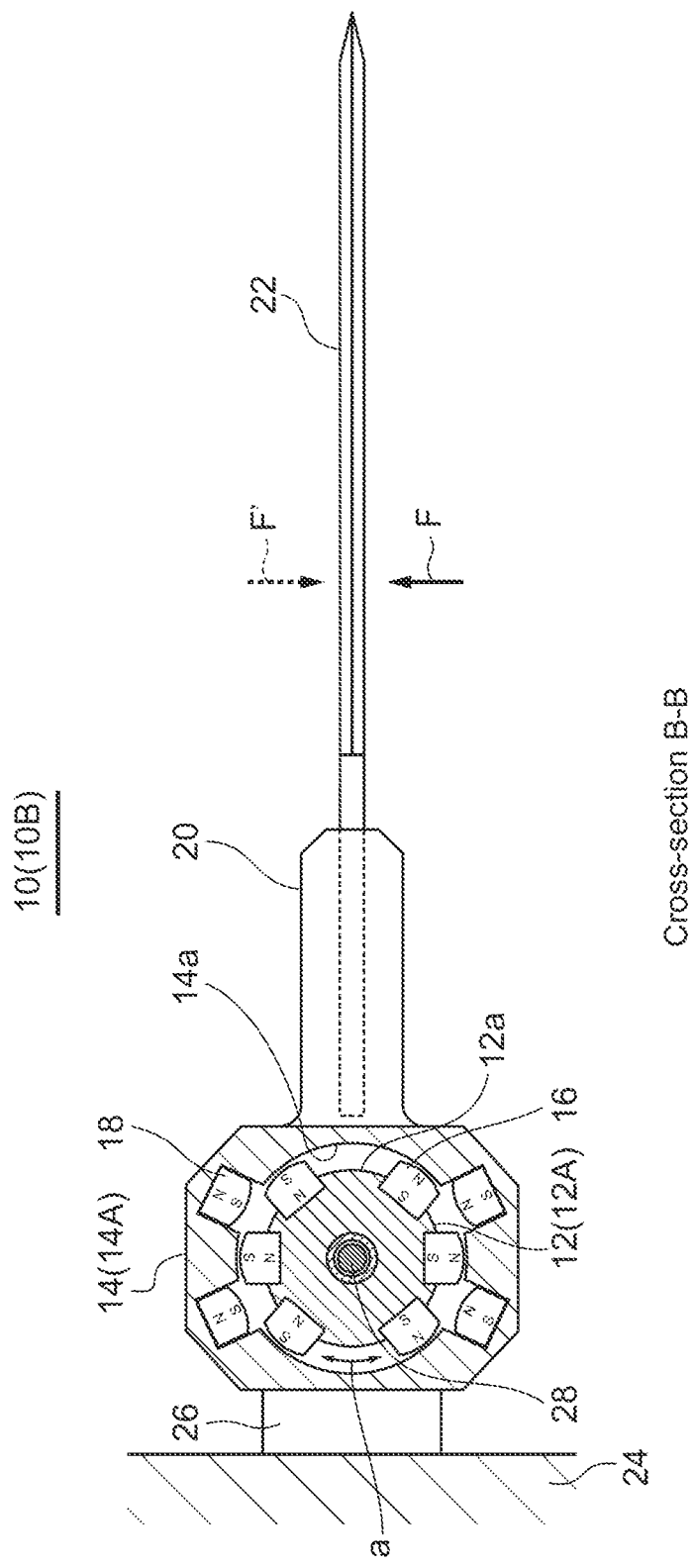
FIG. 4A is a plan cross-sectional view taken along line B-B in FIG. 3.
Figure 4B:
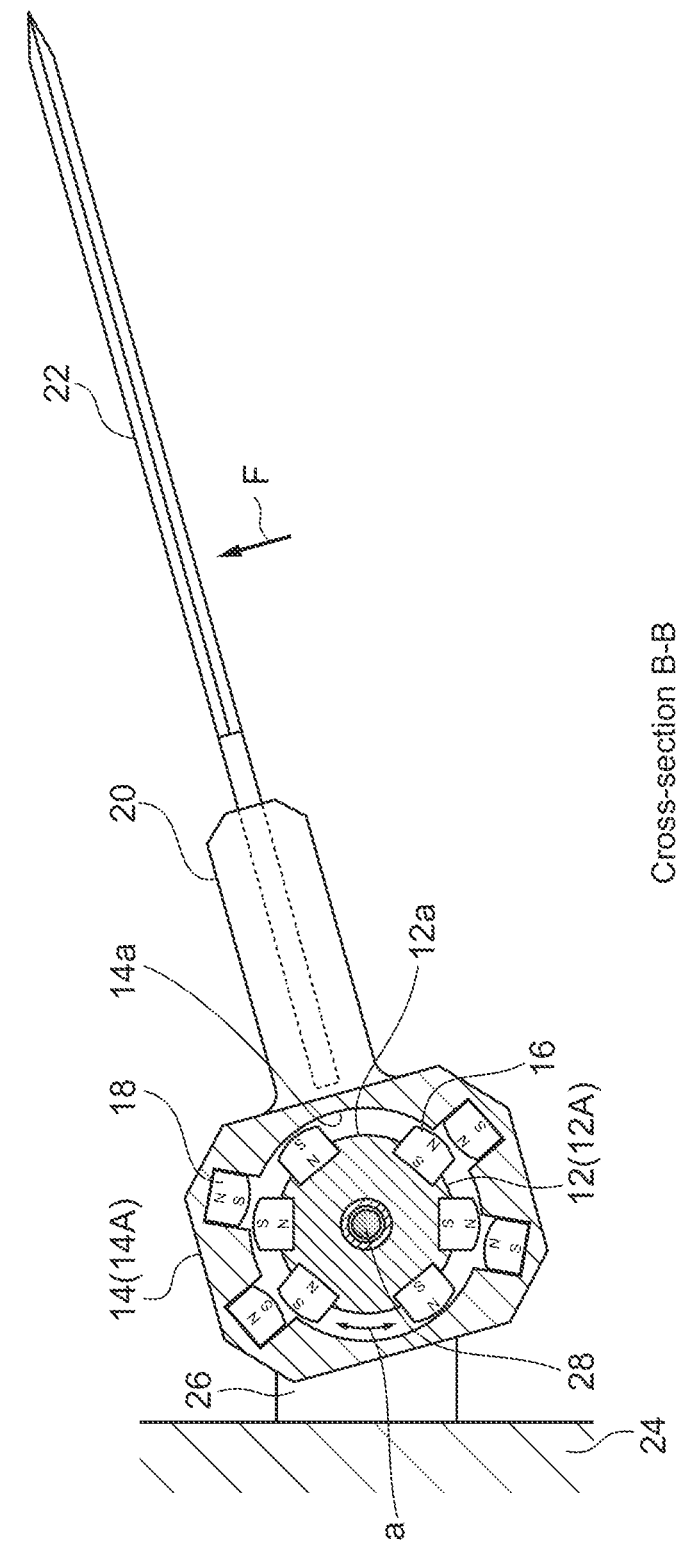
FIG. 4B is a plan cross-sectional view taken along line B-B in FIG. 3.
Figure 7A:
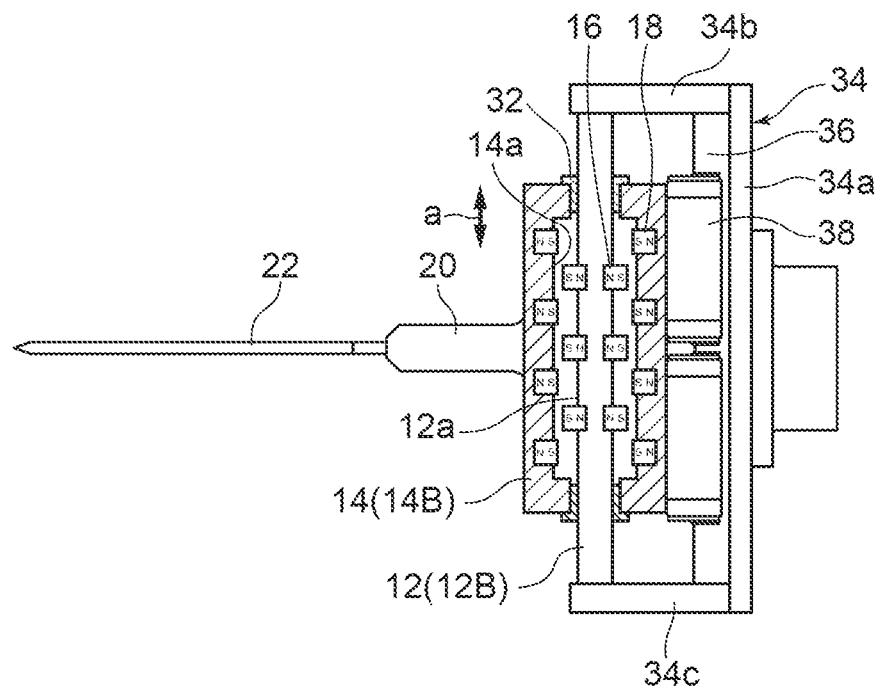
FIG. 7A is a plan cross-sectional view of an elastic support device according to an embodiment.
Figure 7B:
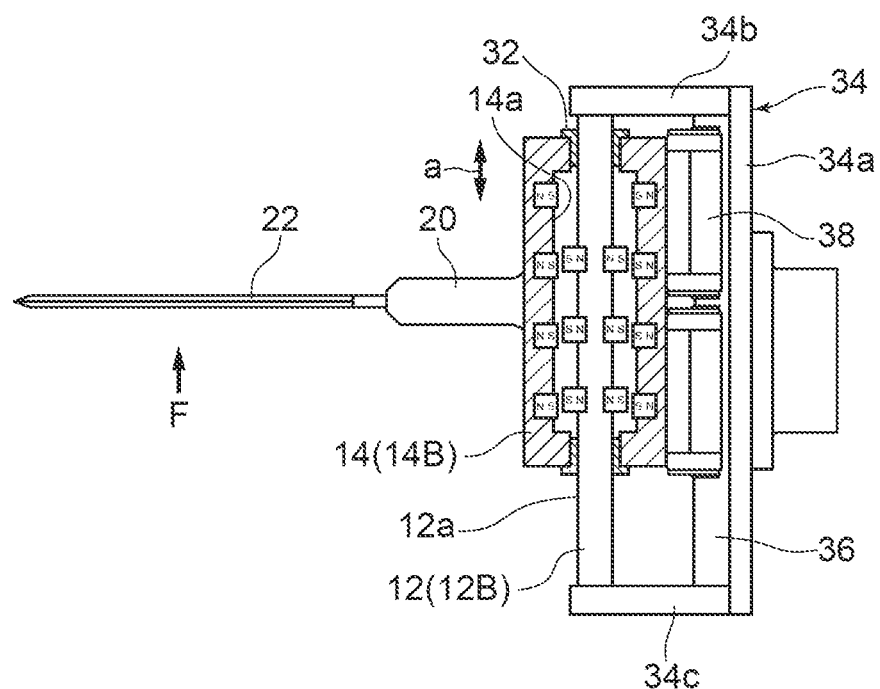
FIG. 7B is a plan cross-sectional view of an elastic support device according to an embodiment.

In an embodiment, in the elastic support device 10 (10B) shown in FIGS. 4A and 4B and the elastic support device 10 (10D) shown in FIGS. 7A and 7B, a first magnetic pole of the first magnet 16 is disposed so as to face toward the second member 14, and a first magnetic pole of the second magnet 18 are disposed so as to face toward the first member. When external force F or external force F' is not applied to the attachment part 22 of the second member 14, the second member 14 is in the original position, and the repulsive force acting between the first member 12 and the second member 14 is balanced, so that the second member 14 is held in the original position. When external force F or external force F' is applied to the attachment part 22 of the second member 14, and the second member 14 is moved in the arrow "a" direction, the repulsive force acts between the first member 12 and the second member 14 so as to return the second member 14 to the original position.

According to this embodiment, after the second member 14 having the second magnet 18 is moved from the original position due to an external force applied to the attachment part 22, when external force F or external force F' is no longer applied, the second member 14 can automatically return to the original position. Thus, the compliance function can be achieved.

In an embodiment, in the elastic support device 10 (10B, 10D), each of the first magnet 16 and the second magnet 18 includes a plurality of magnets arranged at intervals along the arrow "a" direction. Further, each of the plurality of magnets of the first magnet 16 is disposed at an intermediate position between the plurality of magnets of the second magnet 18 along the arrow "a" direction in the original position. Since each magnet constituting the first magnet 16 and the second magnet 18 receives the same repulsive forces from both sides in the arrow "a" direction, the second member 14 is held in the original position when the attachment part 22 does not receive external force F or external force F'.

According to this embodiment, when external force F or external force F' is applied to the support target part 20, and the second member 14 is moved along the arrow "a" direction, the repulsive forces acting on each magnet constituting the first magnet 16 and the second magnet 18 from both side lose balance, and a force to return to the original position is generated. Accordingly, when external force F or external force F' is no longer applied, the second member 14 can return to the original position accurately.

If the magnets constituting the first magnet 16 and the second magnet 18 have the same size and shape and generate the same magnetic force, each magnet receives the same repulsive forces from both sides. Accordingly, when the support target part 20 no longer receive external force F or external force F', the second member 14 can return to the original position accurately.

Further, in the original position, when each magnet constituting the first magnet 16 and the second magnet 18 is accurately in the intermediate position between the counter magnets, each magnet receives the same repulsive forces from both sides. Accordingly, when external force F or external force F' is no longer applied, the second member 14 can return to the original position accurately.

In an embodiment, in the elastic support device 10 (10A, 10B) shown in FIGS. 1 to 4A and 4B, the first member 12 (12A) constitutes one of an inner shaft or an outer shaft of a double structure, and the second member 14 (14A) constitutes the other of the inner shaft or the outer shaft. Further, one of the inner shaft or the outer shaft is configured to be rotatable about an axis of the inner shaft and the outer shaft relative to the other of the inner shaft or the outer shaft. In the embodiments shown in FIGS. 1 to 4A and 4B, the inner shaft and the outer shaft form a double structure arranged concentrically with each other. The first member 12 (12A) constitutes the inner shaft, and the second member 14 (14A) constitutes the outer shaft. However, in another embodiment, the configuration may be reversed. According to this embodiment, it is possible to perform compliance operation in which the attachment part 22 is elastically supported by an urging force against the swinging motion of the attachment part 22 about the axis, and returned to the original position.

The support structure of the first member 12 (12A) and the second member 14 (14A) according to the elastic support device 10 (10A, 10B) will now be described. A pair of support brackets 26 is fixed to a base 24 at a distance. The first member 12 (12A) and the second member 14 (14A) are inserted between the support brackets 26. The first member 12 (12A) disposed on the inner side is fixed to the support bracket 26 via a bolt 28. The second member 14 (14A) is disposed so as to be movable via a bearing 30 arranged around the first member 12.

In an embodiment, the first surface 12a and the second surface 14a have a cylindrical shape, and the second member 14 (14A) is disposed rotatably about the axis, which is the bolt 28.

In an embodiment, in the elastic support device 10 (10C, 10D) shown in FIGS. 5 to 7A and 7B, the second member 14 (14A) is configured to be slidable relative to the first member 12 (12B).

According to this embodiment, it is possible to perform compliance operation in which the attachment part 22 is supported so as to be translationally movable in response to external force F or external force F', and the attachment part 22 is elastically supported by an urging force such as magnetic force, and returned to the original position.

FIG. 7A is a diagram corresponding to FIG. 6A showing the elastic support device 10 (10), and FIG. 7B is a diagram corresponding to FIG. 6B showing the elastic support device 10 (10C).

In an embodiment, in the elastic support device 10 (10C, 10D), the first member 12 (12B) includes one of an inner shaft or an outer shaft of a double structure, and the second member 14 (14B) includes the other of the inner shaft or the outer shaft. Further, one of the inner shaft or the outer shaft is configured to be movable along the axial direction of the inner shaft and the outer shaft relative to the other of the inner shaft or the outer shaft. According to this embodiment, the second member 14 can stably move in the axial direction. Further, a space for arranging the first magnet 16 on the first surface 12a and the second magnet 18 on the second surface 14a can be easily ensured.

In the embodiments shown in FIGS. 5 to 7A and 7B, the inner shaft and the outer shaft form a double structure arranged concentrically with each other. The first member 12 (12B) constitutes the inner shaft, and the second member 14 (14B) constitutes the outer shaft.

The support structure of the first member 12 (12B) and the second member 14 (14B) according to the elastic support device 10 (10C, 10D) will now be described. A base 34 is composed of a back plate 34a and support plates 34b and 34c extending from both ends of the back plate 34a in a direction perpendicular to the back plate 34a. The inner shaft is provided so as to bridge between the support plates 34b and 34c. A guide rail 36 is provided on the inner surface of the back plate 34a so that the extending direction of the guide rail 36 coincides with the extending direction of the inner shaft. A sliding base 38 is slidably provided on the guide rail 36, and the outer shaft is fixed to a guide 32 disposed around the inner shaft and the sliding base 38. The outer shaft constituting the second member 14 moves along the inner shaft together with the guide 32 and the sliding base 38 when the attachment part 22 receives external force F in the extending direction of the inner shaft.

In an embodiment, at least one of the first magnet 16 or the second magnet 18 is composed of a permanent magnet. With this configuration, it is possible to eliminate the necessity of a cable for supplying current to the first magnet 16 or the second magnet 18, as required in an electromagnet. Therefore, there is no risk that the cable is entangled with the first member 12 or the second member 14 by the movement of the members, hindering the free movement of the attachment part 22, or that the presence of the cable limits the amount of movement of the attachment part 22.

In an embodiment, the elastic support device 10 constitutes a tip tool attached to the tip of a multi-axis articulated robot arm, and the attachment part 22 constitutes a work tool. By attaching the elastic support device 10 to the robot arm having this configuration, the device can move to any position in three dimensions and perform various operations. At this time, it enables compliance operation which elastically supports the attachment part 22 when external force F or external force F' acts on the attachment part 22, and returns to the original position when external force F or external force F' no longer act. For example, when a knife is attached to the support target part 20, it can be used for cutting bone-in meat of a slaughtered animal. At this time, when the knife receives a reaction force from the bone or meat of a slaughtered animal, the knife is elastically supported against the reaction force while the knife is retracted from the original position, and when the reaction force is no longer applied, the knife can return to the original position. In the cutting of bone-in meat, since multiple robot arms are operated for one bone-in meat, the tip tool of the robot arm needs to be as compact as possible. The elastic support device 10 can meet this need.

Figure 8:
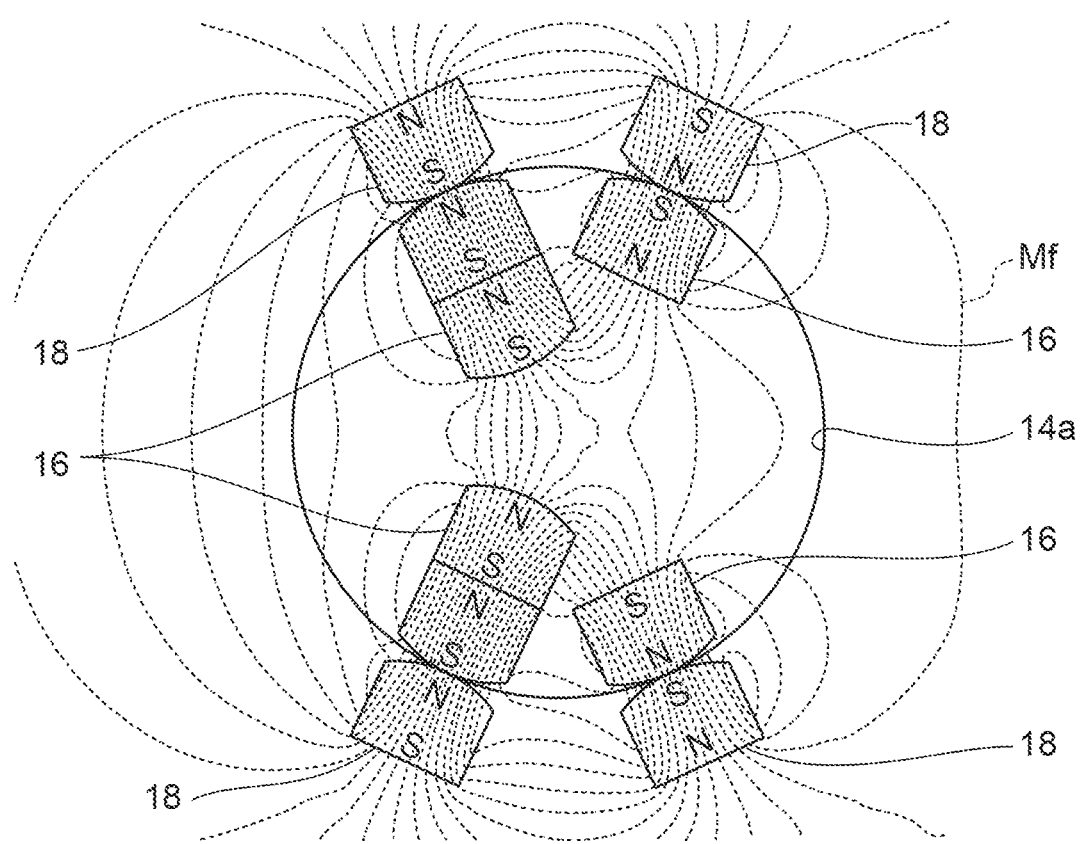
FIG. 8 is a distribution diagram of magnetic field lines of an elastic support device according to an embodiment.
Figure 9:
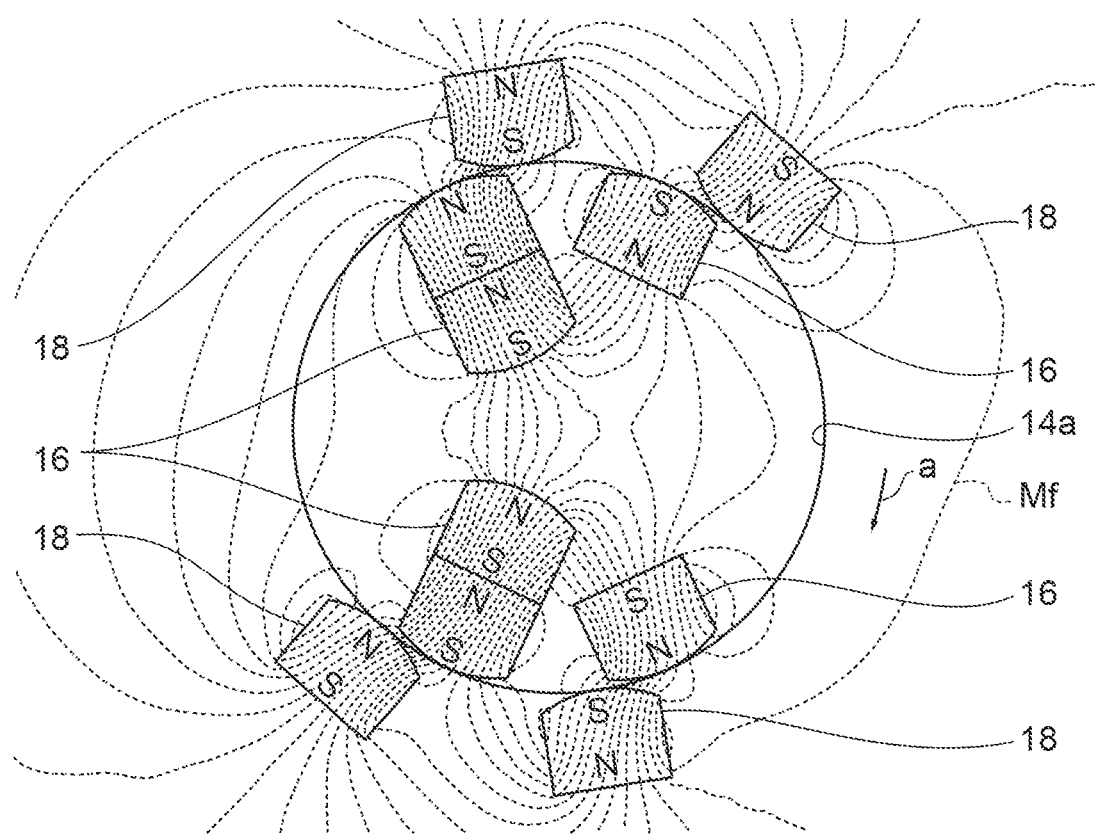
FIG. 9 is a distribution diagram of magnetic field lines of an elastic support device according to an embodiment.

FIGS. 8 and 9 show the distribution of magnetic field lines Mf generated from the first magnet 16 and the second magnet 18 in the elastic support device 10 (10A) shown in FIGS. 1 and 2. FIG. 8 shows the case where the second member 14 (14A) is in the original position, and FIG. 9 shows the case where the second member 14 (14A) is moved from the original position in the arrow "a" direction due to external force F acting on the attachment part 22. As is seen from this figure, the magnetic field lines Mf are generated between the different magnetic poles, and an attractive force is generated between the different magnetic poles. The density of the magnetic field lines Mf is increased when multiple magnets are arranged in the direction perpendicular to the extending direction of the first surface 12a and the second surface 14a. Further, even when external force F is applied to the attachment part 22, and the second member 14 is moved from the original position, an attractive force exists between the different magnetic poles.

Figure 10:
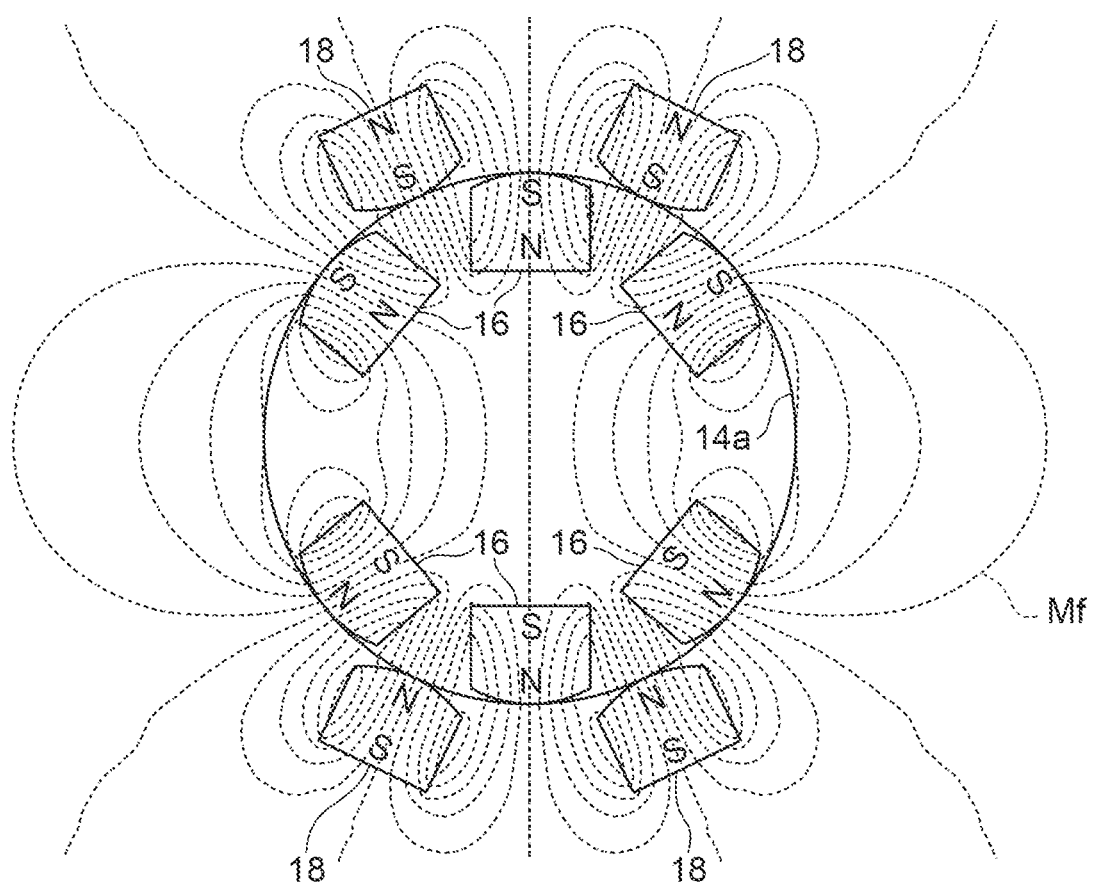
FIG. 10 is a distribution diagram of magnetic field lines of an elastic support device according to an embodiment.
Figure 11:
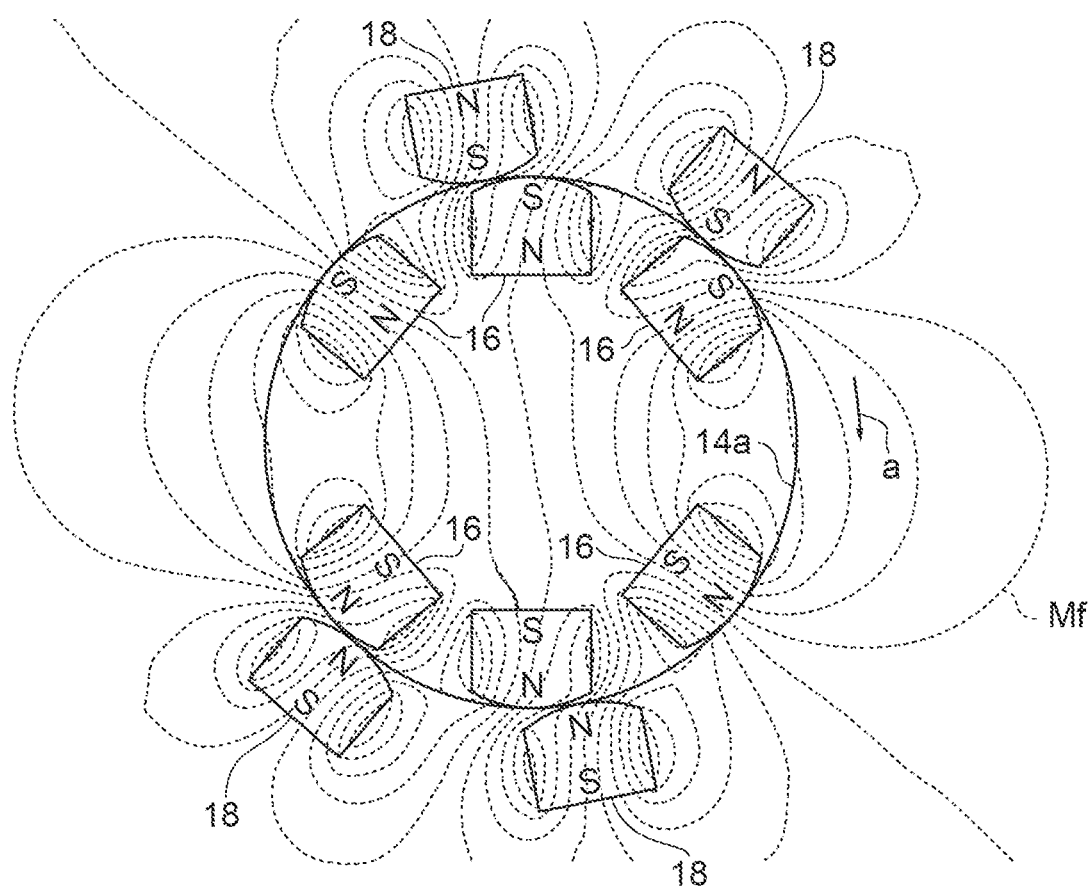
FIG. 11 is a distribution diagram of magnetic field lines of an elastic support device according to an embodiment.

FIGS. 10 and 11 show the distribution of magnetic field lines Mf generated from the first magnet 16 and the second magnet 18 in the elastic support device 10 (10B) shown in FIGS. 4A and 4B. FIG. 10 shows the case where the second member 14 (14A) is in the original position, and FIG. 11 shows the case where the second member 14 (14A) is moved from the original position in the arrow "a" direction due to external force F acting on the attachment part 22. As is seen from this figure, the magnetic field lines Mf are generated between the different magnetic poles, and a repulsive force is generated between the same magnetic poles. When the second member 14 (14A) is in the original position, the same repulsive forces are applied to each magnet from both sides of the extending direction of the first surface 12a and the second surface 14a. Further, when external force F is applied to the attachment part 22, and the second member 14 (14A) is moved from the original position, each second magnet 18 receives a larger repulsive force from the closer first magnet 16 than the farther first magnet 16. The second member 14 (14A) returns to the original position due to the difference in the repulsive forces on both sides.

In the above-described embodiments, the arrangement of north poles and south poles of the first magnet 16 and the second magnet 18 shown in the drawings is for illustrative purpose only. For example, the arrangement of the north and south poles of the first magnet 16 and the second magnet 18 shown in the drawings may be reversed.

INDUSTRIAL APPLICABILITY

According to some embodiments, in a machine element having the compliance function, by reducing contact portions and reducing the influence of friction, it is possible to achieve a compact device.

REFERENCE SIGNS LIST 10 (10A, 10B, 10C, 10D) Elastic support device
12 (12A, 12B) First member
12a First surface
14 (14A, 14B) Second member
14a Second surface
16 First magnet
18 Second magnet
20 Support target part
22 Attachment part
24, 34 Base
34a Back plate
34b, 34c Support plate
26 Support bracket
28 Bolt
30 Bearing
32 Guide
36 Guide rail
38 Sliding base
F, F' External force
Mf magnetic field line

The invention claimed is:

1. An elastic support device, comprising:
a first member including a first magnet; and
a second member including a second magnet and disposed so as to face the first member, the second member being movable relative to the first member in response to receipt of an external force,
wherein a magnetic force acting between the first magnet and the second magnet holds the second member in an original position when the second member does not receive an external force, and the magnetic force returns the second member to the original position when the second member is moved due to receipt of an external force,
wherein the first magnet and the second magnet are disposed so that different magnetic poles face each other in the original position to generate an attractive force between the first magnet and the second magnet,
wherein each of the first magnet and the second magnet includes a plurality of magnets arranged at intervals along a moving direction of the second member, and
wherein the pluralities of magnets of the first magnet and the second magnet are arranged so that magnetic poles alternately different along the moving direction of the second member are facing counter magnets.

2. The elastic support device according to claim 1, wherein a first surface formed by the first member and a second surface formed by the second member are disposed so as to face each other, and
wherein the first magnet is disposed on the first surface, and the second magnet is disposed on the second surface.

3. The elastic support device according to claim 1, wherein at least one of the first magnet or the second magnet is composed of a permanent magnet.

4. The elastic support device according to claim 1, wherein the second member is slidable relative to the first member.

5. The elastic support device according to claim 4, wherein the first member constitutes one of an inner shaft or an outer shaft, and the second member constitutes the other of the inner shaft or the outer shaft, and
wherein one of the inner shaft or the outer shaft is movable along an axial direction of the inner shaft and the outer shaft relative to the other of the inner shaft or the outer shaft.

6. The elastic support device according to claim 1, wherein the second member includes an attachment part for attaching a support target part.

7. An elastic support device, comprising:
a first member including a first magnet; and
a second member including a second magnet and disposed so as to face the first member, the second member being movable relative to the first member in response to receipt of an external force,
wherein a magnetic force acting between the first magnet and the second magnet holds the second member in an original position when the second member does not receive an external force, and the magnetic force returns the second member to the original position when the second member is moved due to receipt of an external force,
wherein a first magnetic pole of the first magnet is disposed so as to face toward the second member, and the first magnetic pole of the second magnet is disposed so as to face toward the first member,
wherein a repulsive force acting between the first member and the second member is balanced when the second member is in the original position, and the repulsive force acts between the first member and the second member so as to return the second member to the original position when the second member is moved due to an external force acting on the second member,
wherein each of the first magnet and the second magnet includes a plurality of magnets arranged at intervals along a moving direction of the second member, and
wherein each of the plurality of magnets of the first magnet is disposed at an intermediate position between the plurality of magnets of the second magnet along the moving direction of the second member in the original position.

8. An elastic support device, comprising:
a first member including a first magnet; and
a second member including a second magnet and disposed so as to face the first member, the second member being movable relative to the first member in response to receipt of an external force,
wherein a magnetic force acting between the first magnet and the second magnet holds the second member in an original position when the second member does not receive an external force, and the magnetic force returns the second member to the original position when the second member is moved due to receipt of an external force,
wherein the first member constitutes one of an inner shaft or an outer shaft, and the second member constitutes the other of the inner shaft or the outer shaft, and
wherein one of the inner shaft or the outer shaft is rotatable about an axis of the inner shaft and the outer shaft relative to the other of the inner shaft or the outer shaft.

* * * * *